United States Patent Office 3,748,357
Patented July 24, 1973

3,748,357
SEMICARBAZIDE WITH SUBSTITUTED PHENYL GROUP
Harald Oertel, Odenthal, Ulrich Eholzer, Cologne, and Friedrich-Karl Rosendahl, Leverkusen, Germany, assignors to Bayer Aktiengesellschaft, Leverkusen, Germany
No Drawing. Continuation-in-part of application Ser. No. 676,082, Oct. 18, 1967. This application June 8, 1970, Ser. No. 44,541
Claims priority, application Germany, Nov. 16, 1966,
F 50,689
Int. Cl. C07c *133/02*
U.S. Cl. 260—554          8 Claims

ABSTRACT OF THE DISCLOSURE

A semicarbazide of the formula:

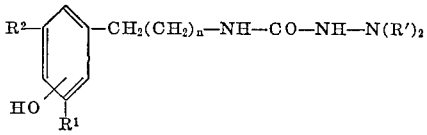

wherein
$R^1$ is selected from the group of tertiary butyl, tertiary amyl, tertiary octyl and tertiary dodecyl;
$R^2$ is alkyl with 1 to 12 carbon atoms, preferably unsubstituted alkyl with 1 to 4 carbon atoms such as methyl or tertiary butyl;
$R'$ is alkyl with 1 to 12 carbon atoms which can be substituted with a hydroxyl, halogen or mercapto group, preferably alkyl with 1 to 4 carbon atoms such as methyl, hydroxy ethyl or hydroxy propyl;
$n$ is an integer from 0 to 12, preferably 0 or 2; and
with the proviso that the —OH group is ortho to $R^1$.

Such compounds are useful to stabilize isocyanates against discoloration during storage.

RELATED APPLICATION

This application is a continuation-in-part of "Process for the Preparation of New Phenol Derivatives," Ser. No. 676,082, filed Oct. 18, 1967, by the present inventors, and abandoned June 9, 1970.

BIBLIOGRAPHY

The starting materials used to prepare the present compounds are described in U.S. 3,121,732.

THIS INVENTION

It has now been found that new derivatives of phenol having the formula given in the Abstract of the Disclosure can be obtained by reacting a compound of the formula:

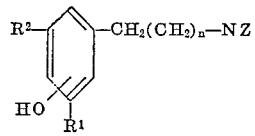

wherein
$R^1$, $R^2$ and $n$ have the meanings given in the Abstract of the Disclosure and
Z denotes 2 hydrogen atoms, =C=O or 1 hydrogen atom and

X representing a halogen atom or an O-aryl radical, which may be substituted;
by known processes, for example:
(a) In the case where Z is $H_2$, with the equivalent quantity of an N,N-dialkyl-hydrazine carboxylic acid ester of the formula

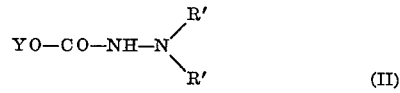

wherein Y denotes an alkyl radical or an optionally substituted aryl radical and $R'$ is as above defined.
(b) In the case where Z is H and =COX with the equivalent quantity of an N,N-dialkylhydrazine of the formula:

if desired in a solvent at a temperature of from 0 to 200° C., the process being optionally carried out in the presence of an acid acceptor in the case where X is a halogen atom or,
(c) In the case where Z is =CO, with the equivalent quantity of an N,N-dialkylhydrazine of the formula

if desired in the presence of a solvent, at a temperature of from 0 to 200° C.

The aryl radicals X and Y, which can be substituted, include those having up to 10 carbon atoms, such as phenyl, or naphthyl, which may carry up to 5 and in particular 1 to 3 substituents. Examples of the substituents are, apart from halogen atoms (preferably fluorine, chlorine, bromine) are lower alkyl radicals containing 1 to 8 carbon atoms and when the radical X is substituted, the substituents may also be a maximum of two nitro groups. The phenol radical is preferably an o,o'-di-tertiary phenol radical, such as o,o'-di-tertiary-butyl phenol, or a tertiary alkyl phenol radical in which R is an alkyl radical.

DESCRIPTION OF PROCESSES

In process (a), a compound of the Formula I wherein Z is $H_2$ is reacted with an N,N-dialkyl hydrazine carboxylic acid (II), preferably in approximately equivalent quantities, the hydroxyl component of the ester being split off. The reaction can most simply be carried out by reacting the amine with the N,N-dialkylhydrazine carboxylic acid ester, e.g. at temperatures between about 0 to 200° C. preferably 50 to 160° C. The hydroxyl component of the ester is preferably an unsubstituted phenol radical or a phenol radical which is substituted by halogen atoms, or alkyl or nitro groups. The hydroxyl component that is split off can be distilled off during the reaction, if desired continuously, this distillation being promoted, if desired, by application of a slight vacuum. On the other hand, the reaction can be carried out in a high boiling organic solvent such as toluene, xylene, chlorobenzene, di- or trichlorobenzene, glycol or glycol dimethyl ether, and if desired under pressure.

Examples of suitable aminoalkylphenols (I) in which Z is $H_2$ are:

3,5-di-tertiary-butyl-4-hydroxy-benzyl-amine,
3,5-di-tertiary-butyl-4-hydroxyphenyl-β-ethylamine,
3,5-di-tertiary-butyl-4-hydroxyphenyl-β-methyl-γ-propylamine,
3,5-di-tertiary-amyl-4-hydroxyphenyl-γ-propylamine,
3,5-di-tertiary-butyl-4-hydroxyphenyl-γ-propylamine,
3,5-di-tertiary-octyl-4-hydroxyl-γ-propylamine,
3,5-di-tertiary-butyl-4-hydroxyphenyl-ω-hexylamine,
3-isopropyl-5-tertiary-butyl-4-hydroxyphenyl-γ-propylamine,
3-methyl-5-tertiary-butyl-4-hydroxyphenyl-γ-propylamine, 3-methyl-5-tertiary-butyl-4-hydroxybenzylamine,
3-ethyl-5-tertiary-butyl-4-hydroxyphenyl-γ-propylamine,
2-hydroxy-3-tertiary-butyl-5-methyl-phenyl-γ-propylamine,
3-chloro-4-hydroxy-5-tertiary-butyl-phenyl-ethylamine,
3-chloro-4-hydroxy-5-tertiary-butyl-phenyl-γ-propylamine,
2-bromo-4-hydroxy-5-tertiary-amyl-benzylamine,
3-methoxy-4-hydroxy-5-tertiary-butyl-γ-propylamine, and
2-hydroxy-3-tertiary-butyl-5-methoxy-phenyl-β-ethylamine.

The N,N-dialkylhydrazine carboxylic acid esters (II) can, for example, be based on the following N,N-dialkylhydrazines, $H_2N-N(R^1)_2$: N,N-dimethylhydrazine, N,N,-diethylhydrazine, N,N-dibutylhydrazine, N,N-isopropylhydrazine, and N,N-didodecylhydrazine, N,N-dialkylhydrazine carboxylic esters can be prepared by known processes. Suitable esters are, for example alkyl esters such as methyl, ethyl, butyl or cyclohexyl esters or aryl esters, preferably phenyl esters such as phenyl, tolyl, chlorophenyl or o- or p-nitrophenyl esters. The preferred ester used in the reaction is N,N-dimethylhydrazine carboxylic acid phenyl ester (from diphenyl carbonate and dimethylhydrazine).

Phenyl carbamates or suitably sterically hindered phenols can be reacted by process (b) with approximately equivalent or excess quantities of dialkylhydrazines (see under (a)) in bulk or in inert solvents such as tetrahydrofuran, dioxane, ethyl acetate, chlorobenzene or xylene until the corresponding phenols are split off. This can take place at different temperatures depending on the nature of substitution of the phenols, the temperatures being generally in the region between about 0 and about 200° C. in particular between about 50 to 160° C. In the case of low boiling dialkyl hydrazines, it may be advisable to cary out the reaction at elevated pressure.

If, in process (b) carbamic acid halides wherein Z is H and =COX (preferably chlorine in Formula I), which can be obtained by known methods, e.g. by carefully reacting amines with phosgene in inert solvents, are reacted with dialkylhydrazines, it is generally sufficient to operate at the lower temperature range. The carbamic acid chloride is reacted in inert solvents such as diozane, benzene, ethyl acetate or carbon tetrachloride with equivalent or excess quantities of dialkyl hydrazines, preferably in the presence of acid acceptors such as tertiary organic amines, e.g. triethylamine, dimethylbenzylamine or pyridines, or aqueous solutions or suspensions of hydroxides, carbonates or bicarbonates such as sodium hydroxide, KOH, $Na_2CO_3$, sodium bicarbonate or calcium carbonate. The reaction can, of course, also be carried out in the presence of excess quantities of N,N-dialkylhydrazines as acid acceptors. The reaction between carbamic acid chloride and N,N-dialkylhydrazine can also be carried out as an interfacial synthesis, e.g. using a carbamic acid chloride solution in carbon tetrachloride and aqueous dialkylhydrazine solution, if desired in the presence of further acid acceptors.

In process (c), isocyanates of the Formula I, wherein Z is =CO, are preferably reacted in inert solvents such as petroleum ether, tetrahydrofuran, diozane, ethylacetate, benzene, or trichlorobenzene with preferably equivalent quantities of N,N-dialkylhydrazines (see under (a)). Owing to the smooth reaction between the isocyanates and the hydrazine compound, the reaction proceeds rapidly usually without external supply of heat, in some cases even below 0° C. One may therefore also use alcohols such as ethanol, isopropanol or preferably tertiary butanol as solvents if the reaction is carried out in that temperature range. A temperature range of about 0 to about 200° C., preferably 50 to 160° C. will generally be employed, especially in cases where inert organic solvents are used.

THE PRODUCT

The phenols obtainable by the process described in which N,N-dialkyl-semicarbazide groups are attached to the benzene nucleus via alkylene groups, are all colorless and in some cases crystalline compounds. The following are examples:

1,1-dimethyl-4-(4'-hydroxy-3',5'-di-tertiary-butyl-phenyl-propyl)-semicarbazide;
1,1-diethyl-4-(4'-hydroxy-3',5'-ditertiary-butyl-phenyl-propyl)-semicarbazide;
1,1-diisopropyl-4-(4'-hydroxy-3',5'-di-tertiary-amyl-phenyl-propyl)-semicarbazide;
1,1-dihydroxyethyl-4-(4'-hydroxy-3',5'-ditertiary-butyl-phenyl-propyl)-semicarbazide;
1,1-di-chloroethyl-4-(4'-hydroxy-3',5'-di-tertiary-butyl-phenylpropyl)-semicarbazide;
1,1-dimethyl-4-(4'-hydroxy-3',5'-di-tertiary-octyl-phenyl-propyl)-semicarbazide;
1,1-dimethyl-4-(2'-hydroxy-3'-tertiary-butyl-5'-methyl-benzyl)-semicarbazide;
1,1-diethyl-4-(2'-hydroxy-3'-tertiary-dodecyl-5'-methyl-benzyl)-semicarbazide;
1,1-diethyl-4-(2'-hydroxy-3',5'-ditertiary-butyl-benzyl)-semicarbazide;
1,1-dimethyl-4-(2'-hydroxy-3'-tertiary-butyl-5'-methyl-phenyl-propyl)-semicarbazide;
1,1-dimethyl-4-(2'-hydroxy-3'-tertiary-amyl-5'-methyl-phenylpropyl)-semicarbazide;
1,1-dimethyl-4-(4'-hydroxy-3',5'-di-tertiary-butyl-benzyl)-semicarbazide;
1,1-dimethyl-4-(4'-hydroxy-3',5'-di-tertiary-butyl-phenethyl)-semicarbazide.

Owing to their weakly basic dialkyl semicarbazide function, they are capable of forming water-soluble salts with acids.

The new phenols have many applications. They are efficient polymerization inhibitors for unsaturated monomer compounds and can easily be removed therefrom, e.g. by salt formation. They are also suitable for use as additives for natural and synthetic fats or oils and as fuels or lubricants. They also have a bactericidal action.

The present compounds are excellent stabilizers against discoloration of isocyanates upon storage. Thus, e.g. the addition of 20 p.p.m. in technical toluylenediisocyanate (2,4-/2,6-isomer ratio 65:35 or 80:20) of the compound obtained as described in Example 1 prevents discoloration upon storage. Whereas unstabilized toluylenediisocyanate upon storage (25° C.) assumes a yellow coloration after 100 days, samples containing 20 p.p.m. of the compound of Example 1 are still colorless after 180 days and samples containing an addition of 15 p.p.m. remain colorless for at least 100 days.

EXAMPLES

Example 1

Method of preparation (a): 104.5 g. of 3,5-di-tertiary-butyl-4-hydroxyphenylpropylamine are heated together with 72 g. of N,N-di-methylhydrazine carboxylic acid phenyl ester for 6 hours at 145° C., the phenol which is split off being largely distilled off during the last three hours at about 40 to 50 mm. Hg. The residue (149 g.) is stirred with water and the crystals are recrystallized from cleaning petrol with the addition of active charcoal. The 116 g. of 1,1-dimethyl-4-(4'-hydroxyl-3',5'-di-tertiary-butyl-phenyl-propyl)-semicarbazide of the formula given below are obtained as colorless crystals; M.P. 160–161° C.

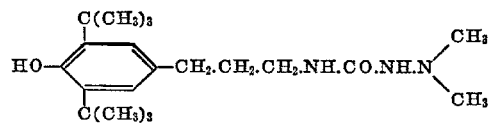

The amine used as starting material is obtained as follows: 370 g. of 3,5-di-tertiary-butyl-4-hydroxy-phenyl-propionitrile are hydrogenated in 1300 ml. of methanol at 80° C. for 2 hours by the addition of 170 ml. of liquid ammonia and 70 g. of Raney cobalt and introduction of $H_2$ under pressure. After filtration and removal of the solvent by distillation, 371 g. of amine (M.P.=120 to 123° C.) are obtained, which yield 312 g. of pure 3,5-di-tertiary-butyl-4-hydroxy-phenyl - γ - propylamine after recrystallization from cleaning petrol/animal charcoal.

Example 2

Method of preparation (c): a solution of 12 g. of N,N-dimethylhydrazine in 50 ml. of cleaning petrol is added dropwise in the course of 5 minutes to a solution of 58 g. of 3,5-di-tertiary-butyl-4-hydroxy-phenyl-propyl-γ-isocyanate in 150 ml. of cleaning petrol, the crystalline 1,1-dimethyl-4-(3′,5′-di-tertiary-butyl - 4′ - hydroxyphenylpropyl)-semicarbazide being obtained in practically quantiative yield. M.P.: 160° C.

The isocyanate used is obtained as follows: 131.5 g. of 3,5-di-tertiary-butyl-4-hydroxy-phenylpropylamine (see Example 1) are dissolved in 500 ml. of chlorobenzene, and converted into the amine hydrochloride by the introduction of gaseous hydrogen chloride at 60° C. 240 g. of phosgene are introduced in the course of 6 hours at reflux temperatures. Excess phosgene is then driven off in a stream of nitrogen, and the solvent is distilled off. After distillation, 93 g. of 3,5-di-tertiary butyl-4-hydroxy-phenyl-propyl-isocyanate of B.P. 192° C./0.13 mm. Hg are obtained as a slightly yellowish, highly mobile oil ($n_D^{20}$ 1.5153) which crystallizes on standing. M.P. 43–45° C.

Example 3 (Method of preparation (b))

76.6 g. of 3,5-di-tertiary-butyl-4-hydroxy-phenyl-propyl-carbamic acid phenylester and 100 g. of N,N-dimethylhydrazine are heated in an autoclave at 70° C. for 2 hours and then at 155° C. for 3 hours. After removal of excess dimethylhydrazine and phenol—split off during the reaction—by evaporation under a vacuum, the residue is recrystallized from petroleum ether. After redissolving twice and recrystallizing, 51 g. of 1,1-dimethyl-4-(3′,5′-di-tertiary-butyl - 4′ - hydroxy-phenyl-propyl)-semicarbazide are obtained. M.P. 159.5 to 160.5° C.

Example 4

23.3 g. of 3,5-di-tert.-butyl-4-hydroxy-benzylamine are heated with 20 g. of N,N-dimethyl-hydrazine-carboxylic acid phenyl ester to 140–145° C. for 7 hours by the process described in Example 1, the phenol being distilled off during heating. After digesting the residue with water the residue is recrystallized from petroleum ether. 25.2 g. of colorless crystals of 1,1-dimethyl-4-(4′-hydroxy-3′,5′-di-tert.-butylbenzyl)-semicarbazide of the melting point 166–168° C. are obtained.

Example 5

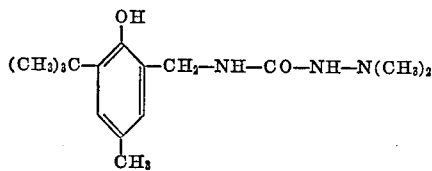

38.2 g. of 2-hydroxy-3-tertiary-butyl-5-methyl-benzylamine are heated with 40 g. of N,N-dimethylhydrazinecarboxylic acid phenyl ester to 150° C. for 3 hours, the phenol split off being distilled off during heating in a slight vacuum (about 50 mm. Hg.). After cooling the residue is dissolved in ethylacetate and extracted by shaking with water. After distilling off the ethyl acetate 30 g. of 1,1 - dimethyl - 4 - (2′ - hydroxy - 3′ - tertiary-butyl-5′-methylbenzyl)-semicarbazide are left in form of a pale yellow oil which solidifies in the cold in glassy form. The nitrogen content is 14.85 percent.

Example 6

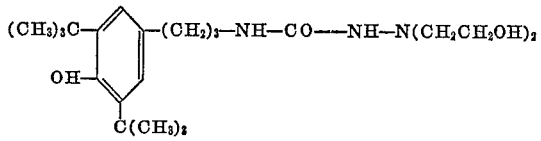

A freshly prepared solution of 8.67 g. of 3,5-ditertiary-butyl-4-hydroxy-phenyl-propyl-γ-isocyanate in 50 ml. of tertiary butanol is added to 3.6 g. of N,N-bis-(β-hydroxyethyl)-hydrazine and the mixture is heated to 40° C. for 1 hour. After distilling off the solvent, 1,1-di-(β-hydroxyethyl)-4-(3′,5′-di - tertiary - butyl - 4′ - hydroxy-phenyl-propyl)-semicarbazide is obtained in form of an oil in quantitative yield; $n_D^{20}$=1.5287. After standing for a prolonged period of time and treating with chloroform and petroleum ether the substance can be obtained crystalline.

Example 7

A freshy prepared solution of 8.67 g. of 3,5-di-tert.-butyl-4-hydroxy-phenyl-propyl-γ-isocyanate in 50 ml. of methanol is mixed with 4.02 g. of N,N-bis-(β-hydroxypropyl)-hydrazine at 50° C. After distilling off the solvent, 1,1-di-(β-hydroxy-propyl) - 4 - (3′,5′-di-tertiary-butyl-4′-hydroxyphenylpropyl)-semicarbazide remains behind as an oil; $n_D^{20}$=1.5079, which can be recrystallized from benzene/petro ether. M.P. 92–94° C. The formula is the same as in Example 6 except that the terminal alkyl position is: $N(CH_2-CHOH-CH_3)_2$.

What is claimed is:

1. Semicarbazide of the formula

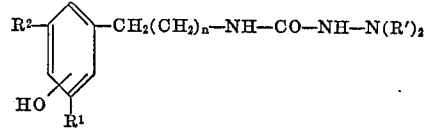

wherein $R^1$ is selected from the group of tertiary butyl, tertiary amyl, tertiary octyl and tertiary dodecyl;

$R^2$ is akyl with 1 to 12 carbon atoms;

R′ is alkyl with 1 to 12 carbon atoms or alkyl with 1 to 12 carbon atoms substituted with hydroxyl or halogen; and n is an integer from 0 to 12, and with the proviso that the —OH group is ortho to $R^1$.

2. Semicarbazide of claim 1 wherein

R is alkyl with 1 to 4 carbon atoms;

R′ is alkyl with 1 to 12 carbon atoms substituted with a hydroxyl or halogen; and n is 0 or 2.

3. Semicarbazide of claim 2 wherein

R is methyl or tertiary butyl; and

R′ is hydroxy ethyl or hydroxy propyl.

4. Semicarbazide of claim 1 having the formula

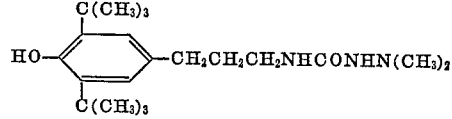

5. Semicarbazide of claim 1 having the formula

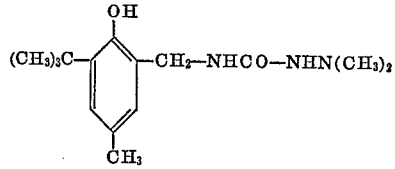

6. Semicarbazide of claim 1 having the formula

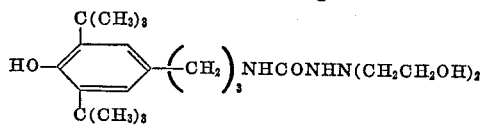

7. Semicarbazide of claim 1 having the formula
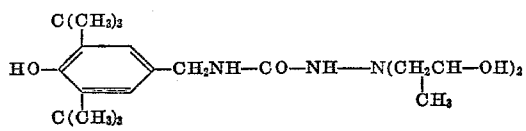
8. Semicarbazide of claim 1 having the formula
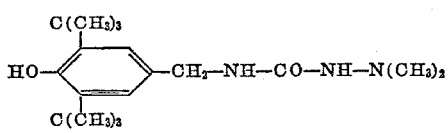
References Cited
UNITED STATES PATENTS
3,344,144  9/1967  Kobayashi _____ 260—554 X
FOREIGN PATENTS
1,544,619  9/1968  France _____ 260—554
HOWARD T. MARS, Primary Examiner
M. W. GLYNN, Assistant Examiner
U.S. Cl. X.R.
260—453 SP, 999